US008865365B2

(12) United States Patent
Otake et al.

(10) Patent No.: US 8,865,365 B2
(45) Date of Patent: Oct. 21, 2014

(54) CONNECTOR AND FUEL CELL

(75) Inventors: Yasuki Otake, Toyota (JP); Hiroshi Fujita, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/700,357

(22) PCT Filed: May 28, 2010

(86) PCT No.: PCT/JP2010/003613
§ 371 (c)(1),
(2), (4) Date: Nov. 27, 2012

(87) PCT Pub. No.: WO2011/148433
PCT Pub. Date: Dec. 1, 2011

(65) Prior Publication Data
US 2013/0209911 A1 Aug. 15, 2013

(51) Int. Cl.
*H01M 8/24* (2006.01)
(52) U.S. Cl.
USPC .......................................... 429/468; 429/467
(58) Field of Classification Search
None
See application file for complete search history.

(56) References Cited

U.S. PATENT DOCUMENTS

| 2006/0105593 | A1* | 5/2006 | Spitler et al. .................... 439/65 |
| 2007/0170517 | A1 | 7/2007 | Furukawa et al. |
| 2008/0003482 | A1* | 1/2008 | Komiyama et al. ............. 429/34 |
| 2009/0136822 | A1 | 5/2009 | Aoto |

FOREIGN PATENT DOCUMENTS

| CN | 101009283 A | 8/2007 |
| CN | 101375446 A | 2/2009 |
| JP | 2001-126815 A | 5/2001 |
| JP | 2002-280098 A | 9/2002 |
| JP | 2004-079195 A | 3/2004 |
| JP | 2006-260791 A | 9/2006 |
| JP | 2007-087858 A | 4/2007 |
| JP | 2007-200633 A | 8/2007 |
| JP | 2007-280872 A | 10/2007 |
| JP | 2008-198429 A | 8/2008 |

* cited by examiner

*Primary Examiner* — Cynthia K. Walls
(74) *Attorney, Agent, or Firm* — Kenyon & Kenyon LLP

(57) ABSTRACT

A connector is connected with a connector joint structure formed in separators in a fuel cell. The connector has: a connector casing; a terminal element that is provided in the connector casing and is configured to be in contact with an edge side of the separator and to be elastically deformed in an insertion direction of the connector that is orthogonal to a stacking direction of the separators, when the connector is connected with the connector joint structure; and an engagement element that is formed in the connector casing and is configured to engage with the connector joint structure and restrict motion of the connector in the insertion direction when the connector is connected with the connector joint structure.

8 Claims, 12 Drawing Sheets

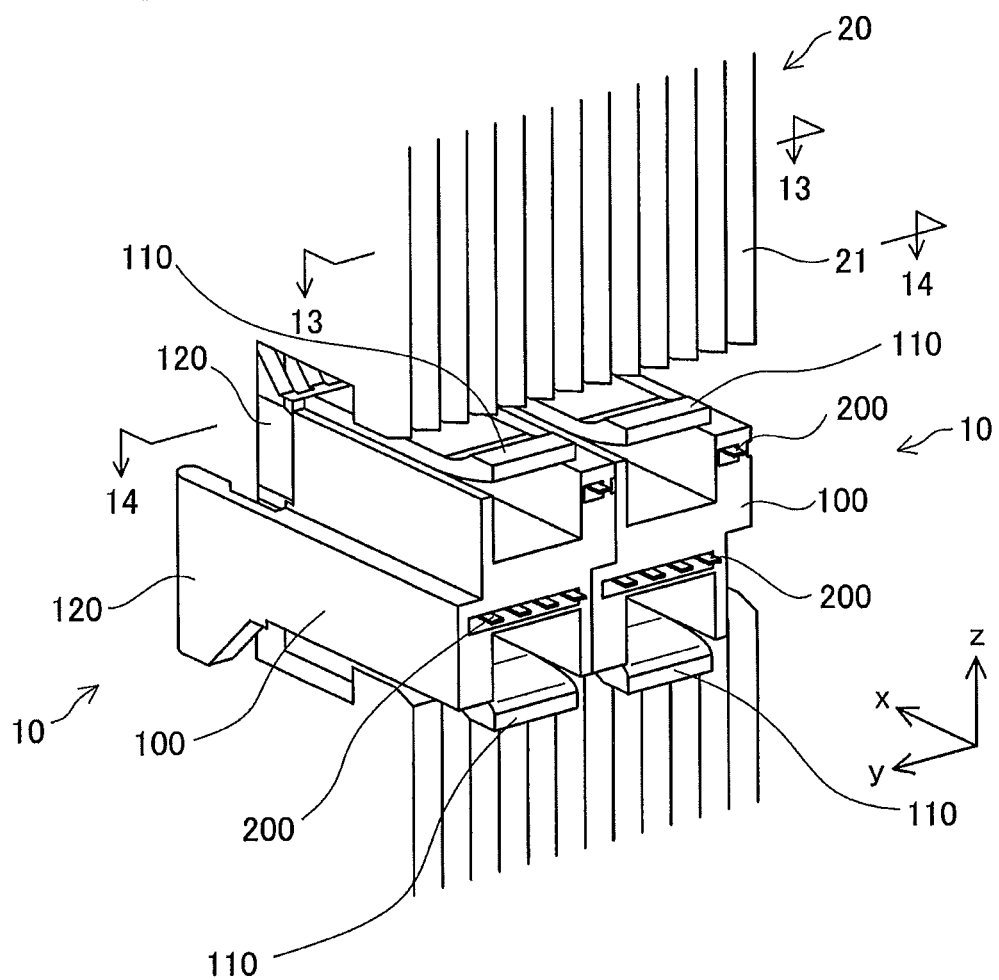

CONNECTOR AND FUEL CELL

This is a 371 national phase application of PCT/JP2010/003613 filed 28 May 2010, the contents of which are incorporated herein by reference.

TECHNICAL FIELD

The present invention relates to a connector and a fuel cell.

BACKGROUND ART

As is conventionally known, a connector is attached to, for example, separators of a fuel cell to detect the voltage of power generation by respective cells of the fuel cell. When the connector is connected with the fuel cell, displacement of the insertion direction of the connector to the fuel cell or misalignment of the insertion position of the connector to the fuel cell may cause bad connection or damage of the fuel cell. In order to solve this problem, one proposed technique provides a protruded guide member on one of the connector and the fuel cell and a recessed groove on the other of the connector and the fuel cell and slides the connector to be connected with the fuel cell while the guide member is fit in the groove (PTL1).

CITATION LIST

Patent Literatures

PTL1: JP 2007-200633A
PTL2: JP 2004-79195A
PTL3 JP 2007-280872A
PTL4: JP 2007-87858A
PTL5: JP 2008-198429A

SUMMARY

Technical Problem

In the proposed technique, however, there is still the possibility of trouble, such as bad connection or damage of the fuel cell, during connection of a connector with the fuel cell.

The present invention is made to solve at least part of the foregoing, and a object of the invention is to reduce the possibility of trouble, such as bad connection or damage during connection of a connector with a fuel cell.

Solution to Problem

In order to achieve at least part of the foregoing, the invention provides aspects and embodiments described below.

According to a first aspect, a connector is connected with a connector joint structure formed in separators in a fuel cell stack. The connector of the first aspect includes: a connector casing; a terminal element that is provided in the connector casing and is configured to be in contact with an edge side of the separator and to be elastically deformed in an insertion direction of the connector that is orthogonal to a stacking direction of the separators, when the connector is connected with the connector joint structure; and an engagement element that is formed in the connector casing and is configured to engage with the connector joint structure and restrict motion of the connector in the insertion direction when the connector is connected with the connector joint structure.

When the connector of the first aspect is connected with the fuel cell, the terminal element is elastically deformed in the insertion direction of the connector to be in contact with the separator. This effectively reduces the possibility of failure, such as bad connection or damage during connection of the connector with the fuel cell.

According to one embodiment of the connector of the first aspect, the terminal element may be formed of a long flat plate member having electrical conductivity and may have a contact surface formed by bending on one end thereof to be in contact with the edge side of the separator, wherein the terminal element may be elastically deformed in its longitudinal direction by pressing the contact surface against the edge side of the separator. In this embodiment, the terminal element is arranged in the connector casing to be elastically deformed in its longitudinal direction by pressing the contact surface against the edge side of the separator. This effectively reduces the possibility of failure, such as bad connection or damage during connection of the connector with the fuel cell.

According to another embodiment of the connector of the first aspect, the engagement element may be provided in the connector casing such that a width of at least part of the connector casing is contractable and expandable in a direction orthogonal to the insertion direction, and when the connector is connected with the connector joint structure, the width of at least part of the connector casing may be expanded to make the engagement element engaged with the connector joint structure. In this embodiment, when the connector is connected with the fuel cell, the width of at least part of the connector casing is expanded. This enables the engagement element to restrict the motion of the connector in the insertion direction.

According to another embodiment of the connector of the first aspect, the engagement element may be provided on respective one of both sides of the connector casing. This structure more readily restricts the motion of the connector in the insertion direction.

According to another embodiment, the connector of the first aspect may further include guide members that are formed in the connector casing to be extended from both sides of the terminal element in the insertion direction and respectively have opposing surfaces that are provided ahead of the terminal element in the insertion direction to face each other in a direction orthogonal to the insertion direction, wherein the guide members clamp the separator by their opposing surfaces that face each other when the connector is connected with the connector joint structure. In this embodiment, the opposing surfaces of the guide members clamp the separator when the connector is connected with the fuel cell. This effectively reduces the possibility of failure, such as bad connection or damage.

According to another embodiment of the connector of the first aspect, a width of the guide member in the direction orthogonal to the insertion direction may be greater than a width of part of the connector casing other than the guide member in the direction orthogonal to the insertion direction. The separator can be clamped by the guide members having the greater width than that of the connector casing. This effectively reduces the possibility of failure, such as bad connection or damage during connection of the connector with the fuel cell.

According to a second aspect, a fuel cell of the second aspect includes: a membrane electrode assembly; separators that are arranged on both sides of the membrane electrode assembly and have a connector joint structure that is to be connected with a connector; and the connector that is connected with the connector joint structure. The connector includes: a connector casing; a terminal element that is provided in the connector casing and is configured to be in contact with an edge side of the separator and to be elastically deformed in an insertion direction of the connector that is orthogonal to a stacking direction of the separators, when the connector is connected with the connector joint structure; and an engagement element that is formed in the connector casing and is configured to engage with the connector joint structure and restrict motion of the connector in the insertion direction when the connector is connected with the connector joint structure. The connector joint structure has: a cutout that is formed by cutting out part of an outer periphery of the separator in the insertion direction; and an engaged element that is formed inside the cutout to engage with the engagement element of the connector.

The fuel cell of the second aspect reduces the possibility of failure, such as bad connection of the connector with the fuel cell or damage during connection of the connector with the fuel cell.

According to one embodiment of the fuel cell of the second aspect, the connector may further include guide members that are formed in the connector casing to be extended from both sides of the terminal element in the insertion direction and respectively have opposing surfaces that are provided ahead of the terminal element in the insertion direction to face each other in a direction orthogonal to the insertion direction, wherein the guide members clamp the separator by their opposing surfaces that face each other when the connector is connected with the connector joint structure, wherein a width of the guide member in the direction orthogonal to the insertion direction may be greater than a width of part of the connector casing other than the guide member in the direction orthogonal to the insertion direction. This structure enables the connector to be readily connected with the fuel cell, thus reducing the possibility of failure, such as bad connection or damage.

The present invention may be implemented by diversity of aspects, for example, a detection device of, for example, voltage, using the connector described above and a fuel cell system including the above connector. The connector or the fuel cell of the invention may be applied in combination with another member as needed.

BRIEF DESCRIPTION OF DRAWINGS

FIG. 1A illustrates the state that connectors according to a first embodiment of the invention are attached to a fuel cell;

DESCRIPTION OF EMBODIMENTS

Some embodiments of the invention are described below.

A. First Embodiment

A-1. External Configuration of Connector

Figure 1B:
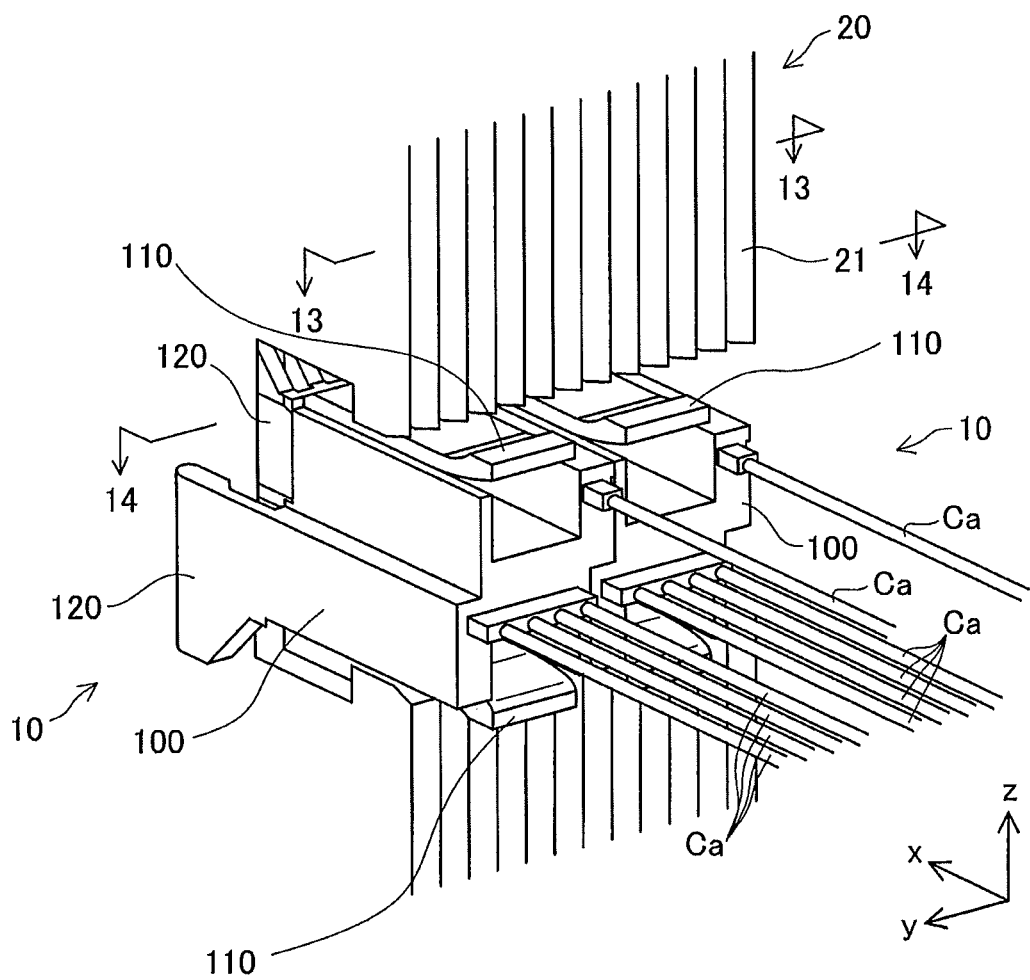
FIG. 1B illustrates the state that cables are connected to the connectors according to the first embodiment of the invention.
Figure 2:
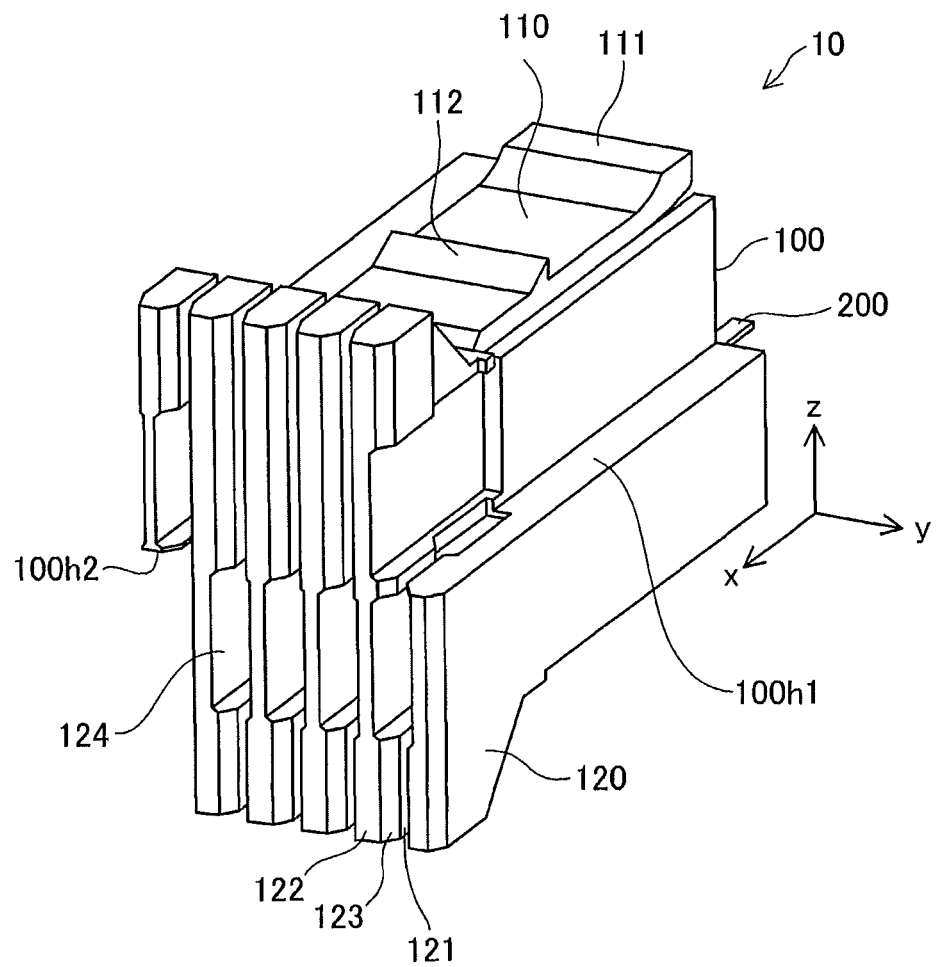
FIG. 2 illustrates the external configuration of the connector according to the first embodiment of the invention.

FIG. 1A illustrates the state that connectors according to a first embodiment of the invention are attached to a fuel cell. FIG. 1B illustrates the state that cables are connected to the connectors according to the first embodiment of the invention. FIG. 2 illustrates the external configuration of the connector according to the first embodiment of the invention. The connector 10 is used to connect detectors (not shown) for detecting voltages with the fuel cell 20 via the cables Ca and is attached to separators 21 of the fuel cell 20 to be electrically connected with the fuel cell 20. FIGS. 1A and 1B (hereinafter collectively referred to as FIG. 1) illustrate the state that two connectors 10 are attached to the separators 21. The connector 10 includes a connector casing 100 made of a resin and formed in a box-like shape and terminals 200 made of a conductive material and held by the connector casing 100.

According to this embodiment, the side of the connector 10 to be connected with the separators 21 is called "front side", and the terminal 200-exposed side of the connector 10 to be connected with the cables Ca is called "back side". The direction connecting the front side with the back side is called "front-back direction". The direction of the connector 10 connected with the fuel cell along the stacking direction of the separators 21 is called "left-right direction". The direction of the connector 10 perpendicular to both the front-back direction and the left-right direction is called "top-bottom direction". The front-back direction of the connector 10 corresponds to x direction of FIGS. 1 and 2. The left-right direction of the connector 10 corresponds to y direction of FIGS. 1 and 2. The top-bottom direction of the connector 10 corresponds to z direction of FIGS. 1 and 2. The front-back direction of the connector 10 in this embodiment corresponds to the "insertion direction" in the claims.

The fuel cell 20 may be any of various types of fuel cells and is a polymer electrolyte fuel cell according to this embodiment. The fuel cell 20 has the stack structure of a plurality of cells (not shown) stacked via the separators 21. In other words, the separators 21 are placed on both sides of each cell in the fuel cell 20. Each cell is a unit module of power generation in the fuel cell 20 and includes a membrane electrode assembly (referred to as MEA) having an anode electrode and a cathode electrode formed on respective surfaces of an electrolyte membrane. Each cell generates electric power by the electrochemical reaction of hydrogen gas with oxygen contained in the air. The respective cells have the same configuration and the same specification according to this embodiment.

The connector casing 100 includes case mounting structures 110, guide members 120, a left-side step element 100$h$1 and a right-side step element 100$h$2. The case mounting structure 110 has a tab element 111 and an engagement element 112. The guide member 120 has an abutting surface 121, an end surface 122, a chamfered edge 123 and a recess 124. The details of the case mounting structure 110 and the guide member 120 will be described later with reference to FIGS. 3 to 5.

The left-side step element 100h1 and the right-side step element 100h2 are multilevel elements formed by shifting the upper section and the lower section of the connector casing 100 relative to each other in the left-right-direction. As illustrated in FIG. 2, the left-side step element 100h1 is formed on one side surface of the connector casing 100 in the left-right direction, while the right-side step element 100h2 is formed on the other side surface of the connector casing 100 in the left-right direction. The left-side step element 100h1 is in contact with the right-side step element of an adjacent connector 10 in the state of attachment of the connectors 10 to the fuel cell 20 as illustrated in FIG. 1. The right-side step element 100h2 is in contact with the left-side step element of an adjacent connector 10. This configuration enables a plurality of connectors 10 to be assembled and integrated and thus ensures easy connection of the separators 21 with the connectors 10 even on the border where the two connectors 10 adjoin to each other.

The terminals 200 are formed of long flat plate members and are arranged in the connector casing 100, such that the longitudinal direction of the terminals 200 is along the front-back direction of the connector casing 100. The terminals 200 are also arranged in the connector casing 100, such that the interval between adjacent terminals 200 in the left-right direction is equal to the interval between the separators 21. The shape of the terminals 200 and the positions of the terminals 200 arranged in the connector casing 100 will be described later with reference to FIGS. 6 to 8.

A-2. Detailed Structure of Connector Casing

Figure 3:
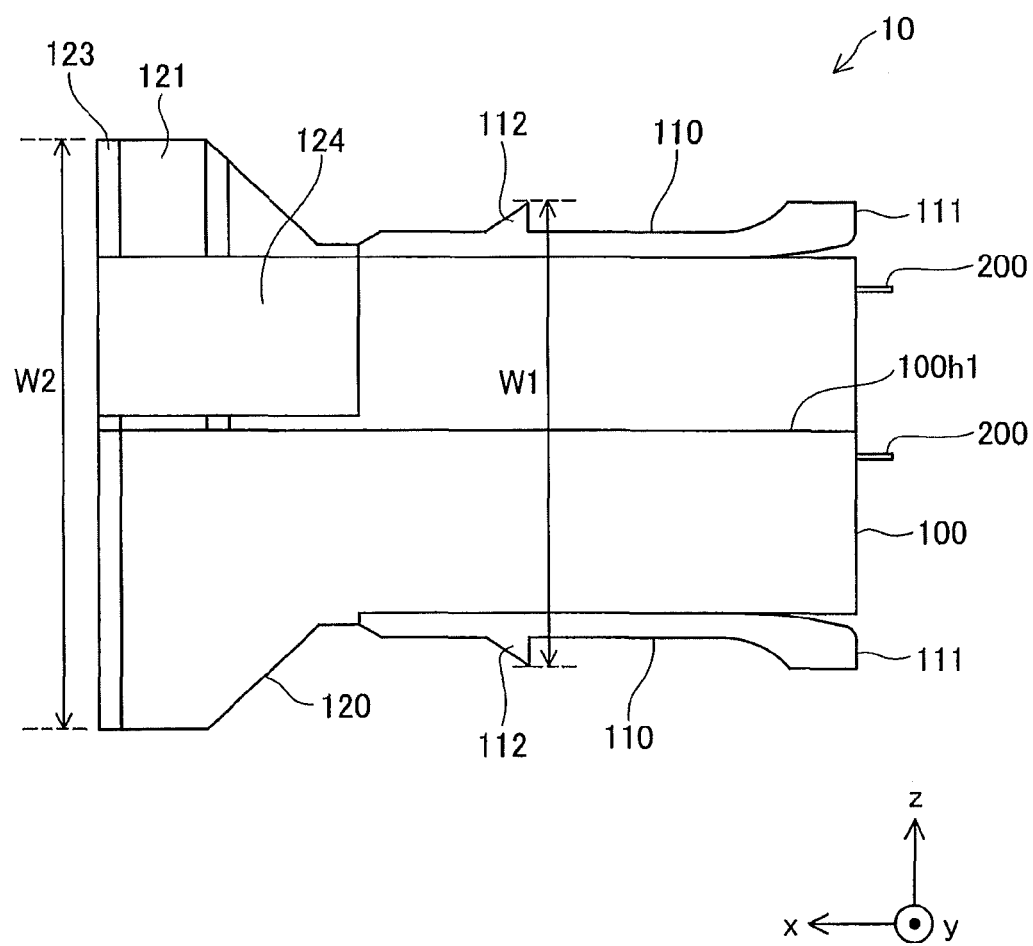
FIG. 3 illustrates the shape of the connector seen from the lateral side.
Figure 4:
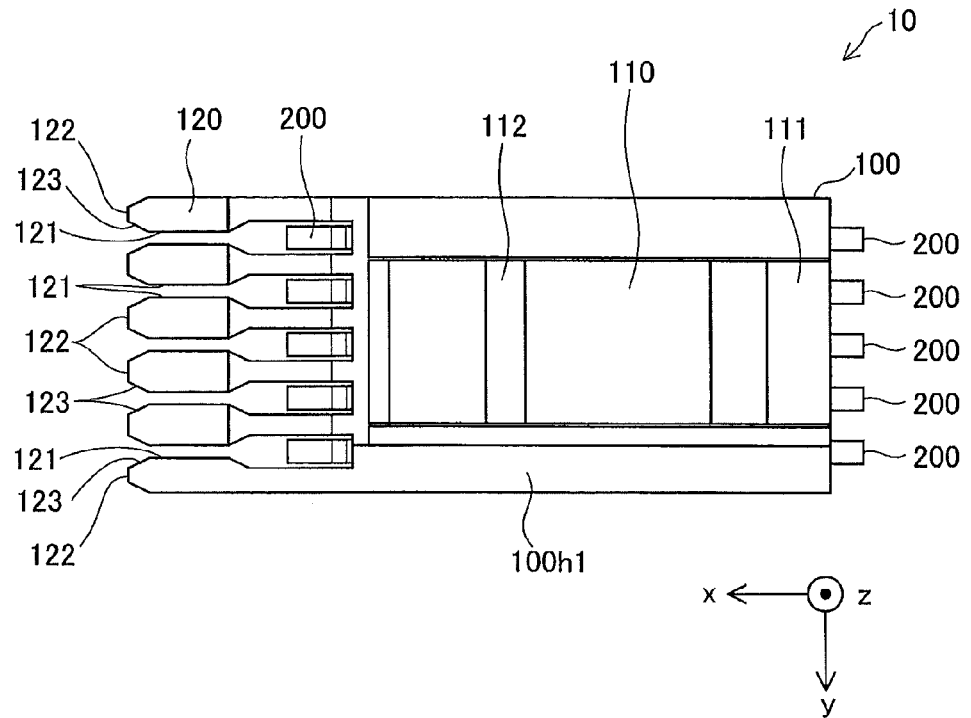
FIG. 4 illustrates the shape of the connector seen from the top side.
Figure 5:
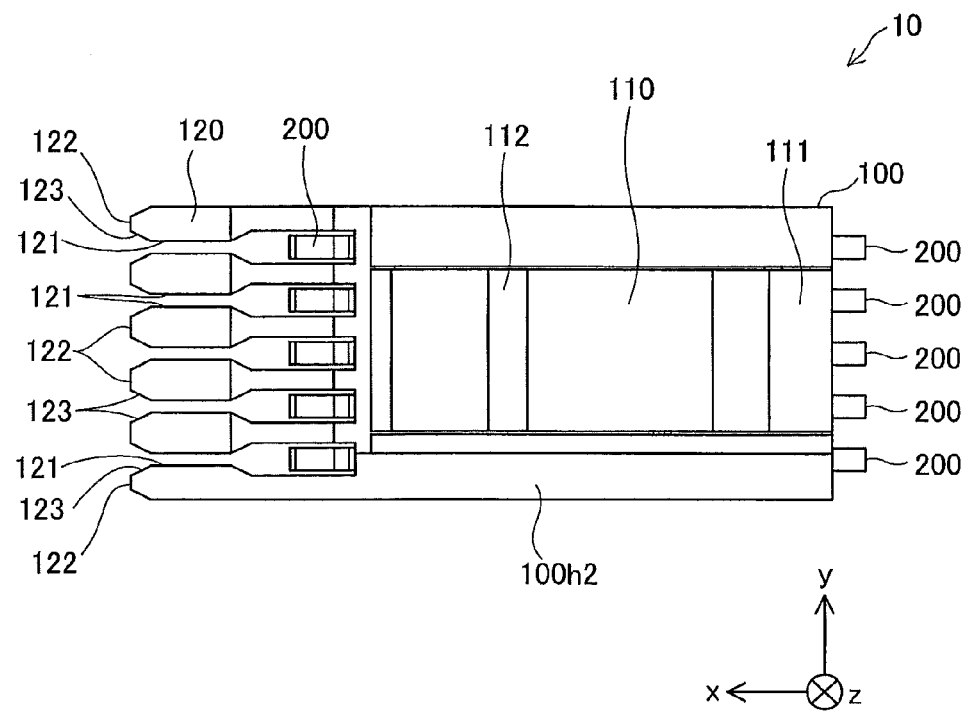
FIG. 5 illustrates the shape of the connector seen from the bottom side.

The following describes the details of the case mounting structure 110 and the guide member 120. FIG. 3 illustrates the shape of the connector seen from the lateral side. FIG. 4 illustrates the shape of the connector seen from the top side. FIG. 5 illustrates the shape of the connector seen from the bottom side. The case mounting structure 110 formed in a long plate-like shape has its front end fixed to the connector casing 100 such that the longitudinal direction of the case mounting structure 110 is along the front-back direction (x direction) of the connector casing 100, and has the tab element 111 formed on its rear end. The case mounting structures 110 are provided on both sides of the connector casing 100 in the top-bottom direction. The case mounting structure 110 has the engagement element 112 provided between the end fixed to the connector casing 100 and the tab element 111.

The engagement elements 112 are protruded in the direction (z direction) perpendicular to the longitudinal direction (x direction) of the respective case mounting structures 110 and are arranged on both sides of the connector casing 100 to expand the width of the connector casing 100 in the top-bottom direction. According to this embodiment, as one of the widths of the connector casing 100 in the top-bottom direction, the width from the apex of one engagement element 112 to the apex of the other engagement element 112 is expressed as width W1. The connector casing 100 is structured to decrease the width W1 under the user's or any other application of a stress of pressing both the tab elements 111 in the directions approaching to each other.

The guide member 120 has a trapezoidal flat plate-like shape and is formed to be extended from the connector casing 100 toward the front side of the connector casing 100. The guide members 120 are arranged on both sides of the terminal 200, such that their main surfaces are along the top-bottom direction of the connector casing 100.

The guide member 120 has a rectangular abutting surface 121 formed on at least one of the main surfaces to clamp the separator. The abutting surface 121 is formed on only part of the main surface according to this embodiment but may be formed over the whole main surface. Each abutting surface 121 faces the abutting surface 121 of an adjacent guide element 120 adjoining across the terminal 200, and the separator 21 is clamped by the two abutting surfaces 121 opposed to each other. More specifically, each abutting surface 121 is opposed to the abutting surface 121 of an adjacent guide member 120 in the left-right direction ahead of the terminal 200. The abutting surfaces 121 are opposed to each other in the direction perpendicular to the insertion direction of the terminal 200.

The guide member 120 is formed to have the greater thickness in the portion with the abutting surface 121 than the thickness of the other portion. This narrows the interval between the opposed abutting surfaces 121 and thereby facilitates clamping of the separator 21. A sufficient interval is, on the other hand, set between the portions of the guide members 120 proximate to the terminal 200, in order to prevent undesirable contact of the terminal 200 with the guide members 120.

The guide member 120 also has the chamfered edge 123 between the abutting surface 121 and the front end surface 122. This prevents the separator 21 from coming into contact with the end surface 122 of the guide member 120 and being damaged, while facilitating insertion of the guide member 120 between two adjacent separators 21. According to this embodiment, the width of the guide member 120 in the top-bottom direction is expressed by a width W2. The width W2 of the guide member 120 in the top-bottom direction is equal to the width of the abutting surface 121 and is the largest width among the widths of the connector casing 100 in the top-bottom direction. The abutting surface 121 corresponds to the "opposing surface" in the claims.

The recess 124 is formed to have the concave cross section in the top-bottom direction by reducing its thickness to be smaller than that of the other portion of the guide member 120. The recess 124 is formed to face the recess 124 of an adjacent guide member 120 adjoining across the terminal 200, and a space that allows pivotal movement of the terminal 200 in the front-back direction is formed by the two opposed recesses 124 as described below.

A-3. Detailed Structure of Terminal

Figure 6:
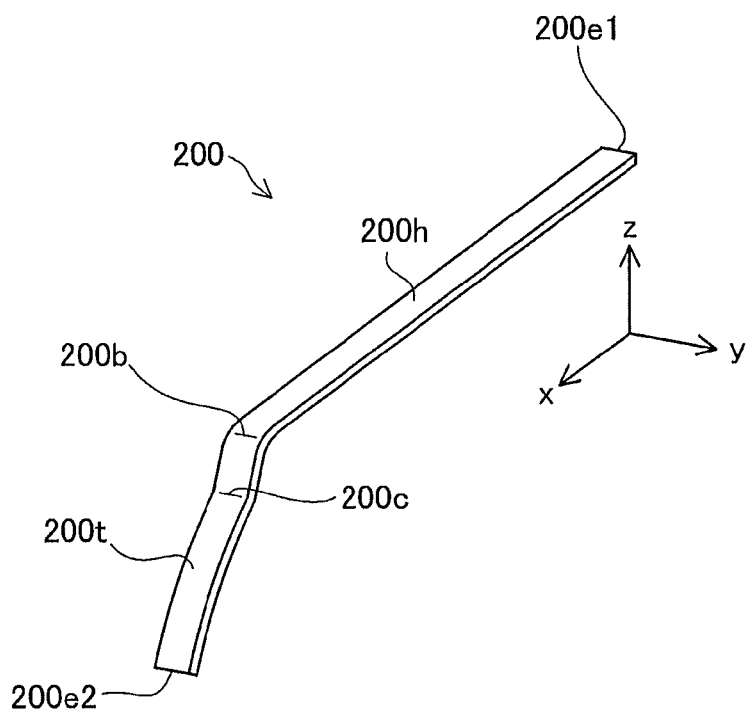
FIG. 6 illustrates the external configuration of a terminal.

FIG. 6 illustrates the external configuration of the terminal. The terminal 200 is formed of a long flat plate member having an end 200e1 and an end 200e2. One end 200e2 is bent at a flexion 200b in the thickness direction (z direction), so that a contact surface 200t is formed between the end 200e2 and the flexion 200b. The contact surface 200t is in contact with the separator 21 when the connector 10 is connected with the fuel cell 20. The terminal 200 has an upper surface 200h between the flexion 200b and the end 200e1 to be bonded to the connector casing 100. The width of the terminal 200 (y direction) is formed to be greater than the thickness of the separator 21. The terminal 200 of the embodiment further has a second flexion 200c formed between the flexion 200b and the contact surface 200t by ending the terminal 200 in the direction opposite to the flexion 200b.

The terminal 200 is formed in the shape bent at the two flexions in the thickness direction according to this embodiment, but may have only one flexion or three or more flexions.

The terminal 200 may be formed in another shape bent in a different direction other than the thickness direction. The terminal 200 is formed to have the fixed width according to this embodiment. As long as the width of the contact surface 200$t$ is greater than the width of the separator 21, the width of the other portion of the terminal 200 may be set arbitrarily.

Figure 7:
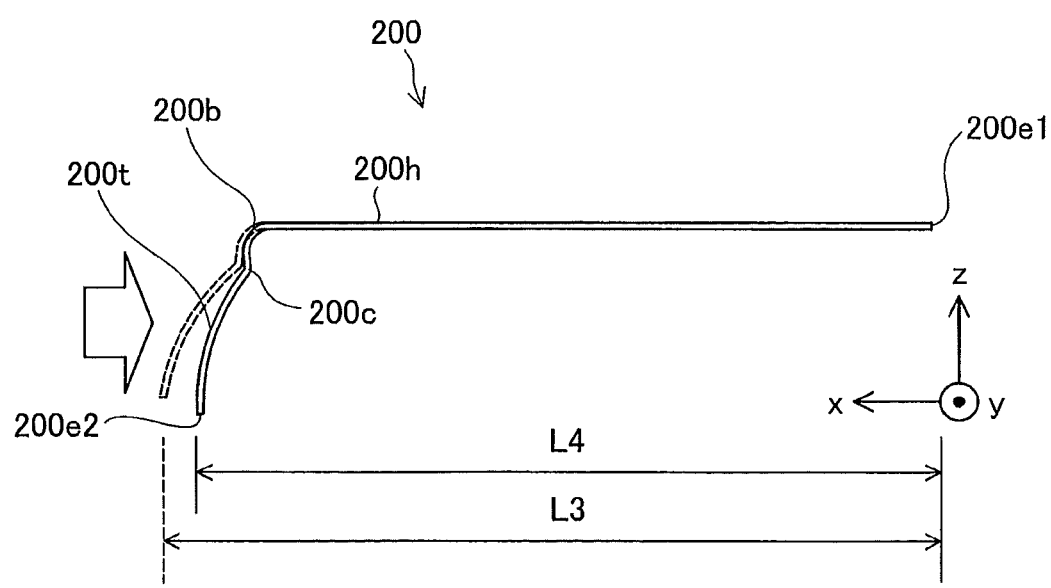
FIG. 7 illustrates expansion and contraction of the terminal.

FIG. 7 illustrates expansion and contraction of the terminal. A length L3 represents the length of the terminal 200 in its extended direction (x direction) under application of no stress, and a length L4 (<L3) represents the length of the terminal 200 in its extended direction under application of a stress in the extended direction to the contact surface 200$t$ (shown by an open arrow in FIG. 7). The terminal 200 is formed to elastically change the length in the extended direction by application of a stress to the contact surface 200$t$ in the extended direction of the terminal 200. More specifically, applying a stress to the terminal 200 reduces the length in the extended direction from L3 to L4, and releasing the stress returns the length in the extended direction from L4 to L3. The terminal 200 has the second flexion 200$c$, so that the flexion 200$b$ and the second flexion 200$c$ cooperatively receive the deformation caused by the stress applied to the contact surface 200$t$. This reduces the amount of deformation at the flexion 200$b$ and prevents deformation of the upper surface 200$h$ induced by the deformation of the flexion 200$b$, thereby preventing the upper surface 200$h$ from coming unstuck from the connector casing 100.

Figure 8:
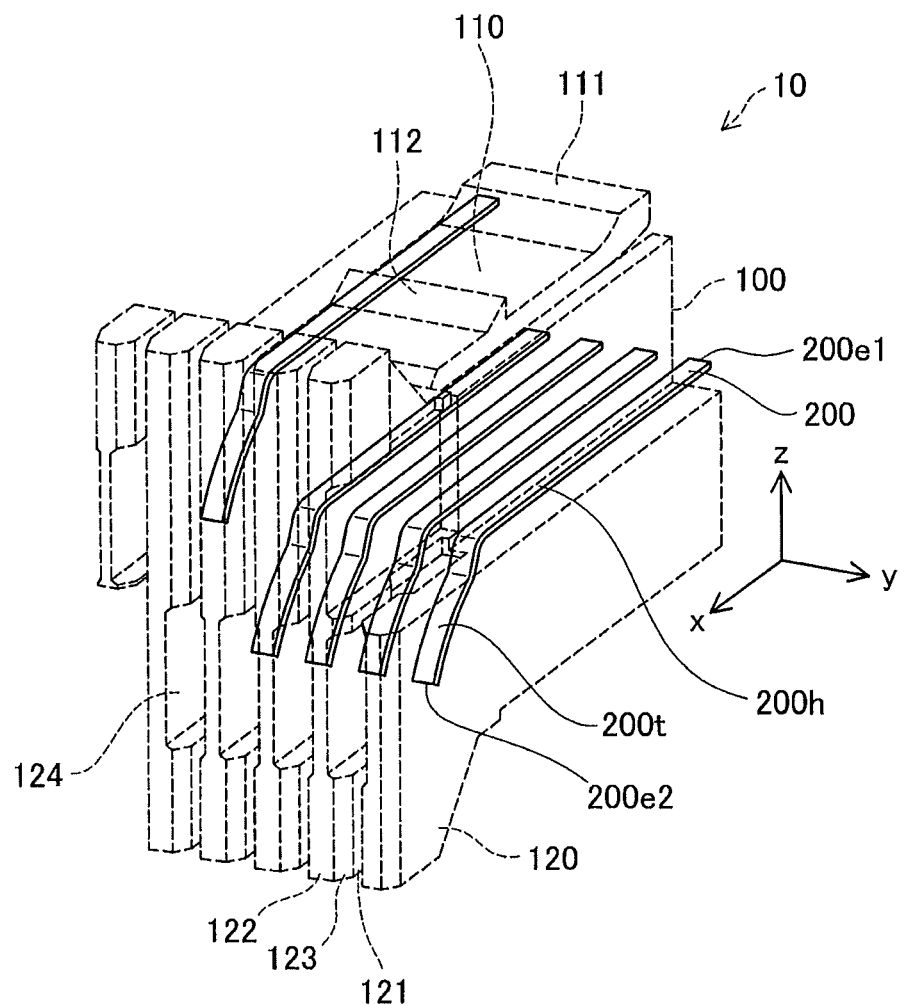
FIG. 8 illustrates the positional relationship between the terminal and a connector casing.

FIG. 8 illustrates the positional relationship between the terminal and the connector casing. As illustrated in FIG. 8, the upper surface 200$h$ of the terminal 200 is fixed to the connector casing 100, such that the end 200$e$2 is located on the front side of the connector casing 100 and the end 200$e$1 is located on the back side of the connector casing 100. In other words, the terminal 200 is held in the connector casing 100, such that the extended direction of the terminal 200 is along the front-back direction of the connector casing 100. The contact surface 200$t$ of the terminal 200 pivotally moves in the front-back direction of the connector casing 100, so that the terminal 200 can elastically expand and contract in the direction along the front-back direction of the connector casing 100.

A-4. Connection State of Connector

Figure 9:
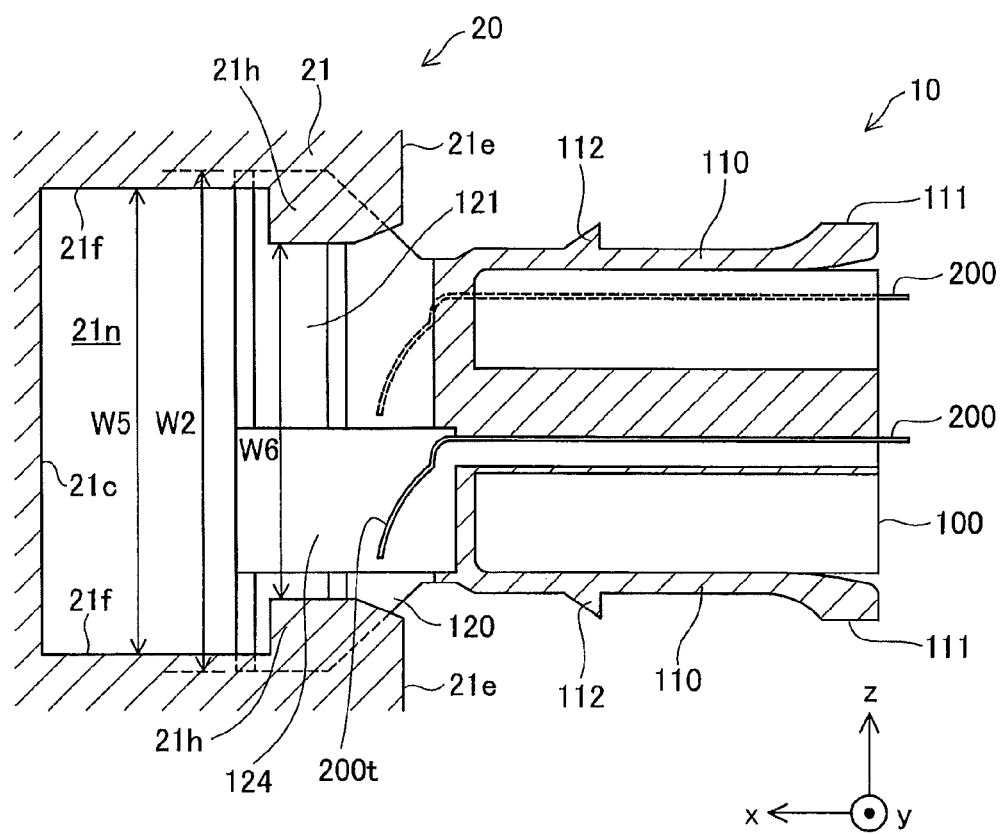
FIG. 9 illustrates the state that guide members of the connector are inserted into the fuel cell.
Figure 10:
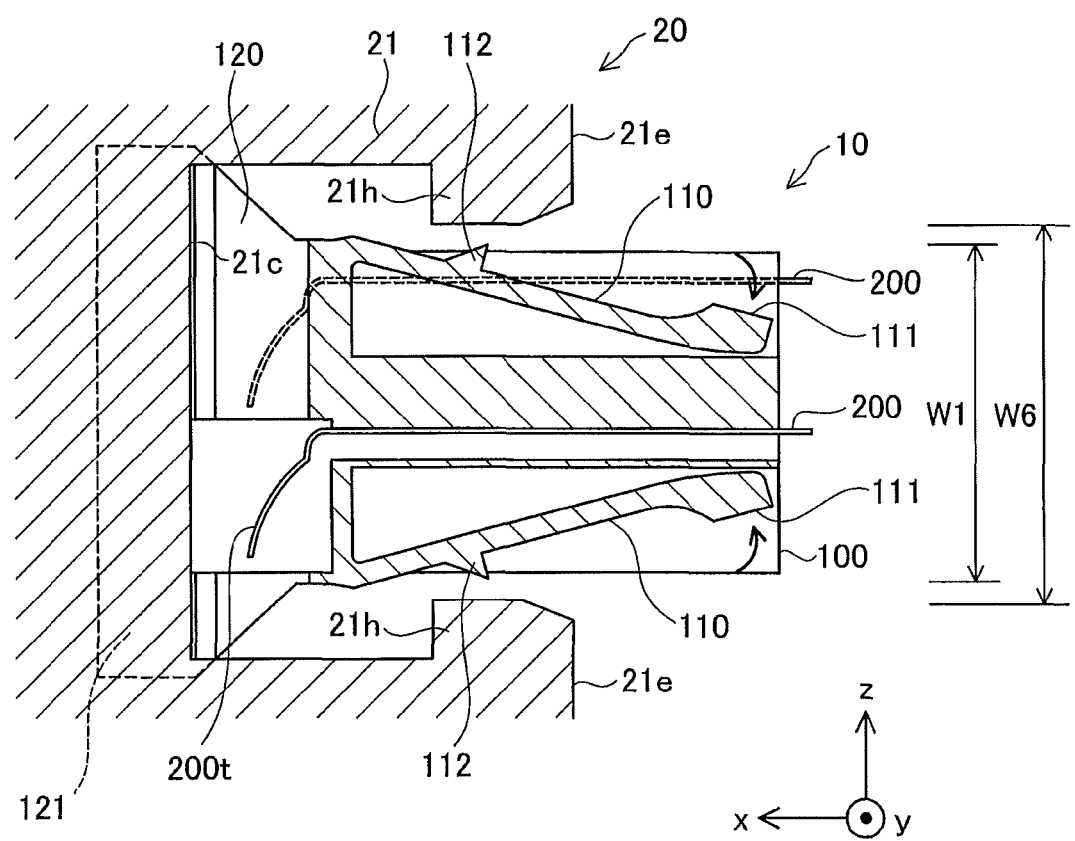
FIG. 10 illustrates the state that case mounting structures of the connector are inserted into the fuel cell.
Figure 11:
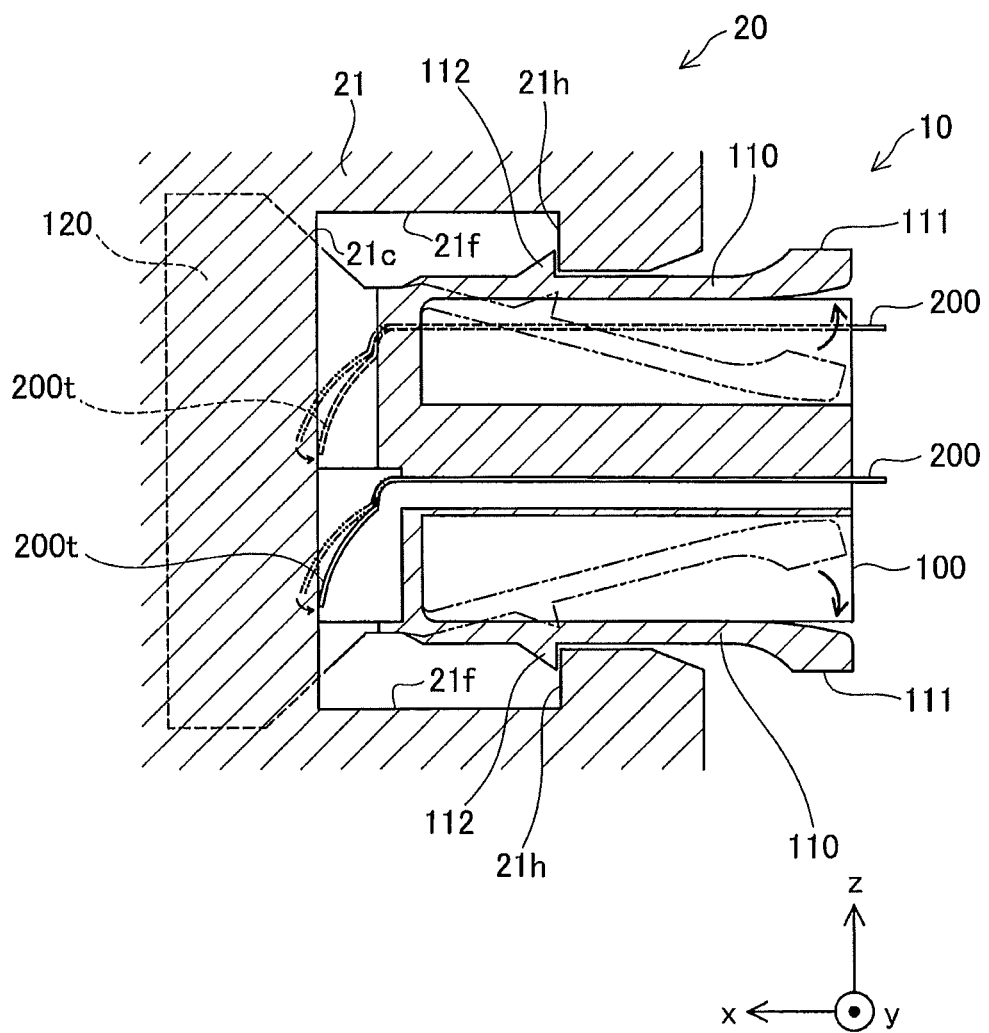
FIG. 11 illustrates the state that the connector is attached to the fuel cell.

The following describes the state that the connector 10 is attached to the fuel cell 20. FIGS. 9 to 11 show a time change in the course of attachment of the connector 10 to the fuel cell. FIG. 9 illustrates the state that the guide members of the connector are inserted into the fuel cell. FIG. 10 illustrates the state that the case mounting structures of the connector are inserted into the fuel cell. FIG. 11 illustrates the state that the connector is attached to the fuel cell.

As illustrated in FIG. 9, the separator 21 of the fuel cell 20 has a cutout 21$n$ in part of an outer peripheral edge side 21$e$ defining the outer periphery. The cutout 21$n$ is formed by cutting part of the outer peripheral edge side 21$e$ in a concave shape. According to this embodiment, the cutout 21$n$ includes a contact edge side 21$c$ formed at the position recessed inward of the separator 21 from the outer peripheral edge side 21$e$ and a pair of opposing edge sides 21$f$ connecting both ends of the contact edge side 21$c$ with the outer peripheral edge side 21$e$. The contact edge side 21$c$ is formed in parallel with the outer peripheral edge side 21$e$, and the opposing edge sides 21$f$ are formed perpendicularly to the outer peripheral edge side 21$e$. The contact edge side 21$c$ is in contact with the terminal 200 in the state of connection of the connector 10 with the fuel cell 20. According to this embodiment, the width of the cutout 21$n$ that is the distance from one opposing edge side 21$f$ to the other opposing edge side 21$f$ is expressed as a width W5. The width W5 of the cutout 21$n$ is made narrower than the width W2 of the guide member 120 in the top-bottom direction. The direction perpendicular to the outer peripheral edge side 21$e$ is called cutting direction of the cutout 21$n$. The contact edge side 21$c$ corresponds to the "edge side of the separator" in the claims. The outer peripheral edge side 21$e$ corresponds to the "outer periphery" in the claims.

An engaged element 21$h$ to engage with the engagement element 112 of the connector casing 110 is formed at the position proximate to the joint between each opposing edge side 21$f$ and the outer peripheral edge side 21$e$. The engaged element 21$h$ is protruded convexly inward of the cutout 21$n$. A width W6 from one engaged element 21$h$ to the other engaged element 21$h$ is made narrower than the width W5 of the cutout 21$n$. The width W6 from one engaged element 21$h$ to the other engaged element 21$h$ is also made narrower than the width W1 from the apex of one engagement element 112 to the apex of the other engagement element 112 of the connector casing 100.

The connector 10 is inserted into the cutout 21$n$ of the fuel cell 20, such that the front-back direction of the connector 10 is along the cutting direction of the cutout 21$n$. The connector 10 is also inserted, such that the guide members 120 clamp the separator 21 in between in the left-right direction. The guide member 120 is formed to have the width W2 in the top-bottom direction greater than the width W5 of the cutout 21$n$. The guide members 120 can thus clamp the separator 21 at least on both ends in the top-bottom direction during insertion of the connector 10 into the cutout 21$n$. In other words, the both ends of the guide member 120 in the top-bottom direction are located between the pair of separators 21 facing each other during insertion of the connector 10 into the cutout 21$n$. This configuration restricts the motion of the connector 10 in the stacking direction in the course of insertion of the connector 10 into the cutout 21$n$.

As illustrated in FIG. 10, pressing the tab elements 111 on both sides of the connector 10 in the directions approaching to each other makes the width W1 from one engagement element 112 to the other engagement element 112 narrower than the width W6 from one engaged element 21$h$ to the other engaged element 21$h$ of the cutout 21$n$. In the course of insertion of the connector 10 into the cutout 21$n$, pressing the tab elements 111 on both sides in the directions approaching to each other causes the engagement elements 112 of the connector casing 100 to go through the space between the two engaged elements 21$h$ and thereby enables the connector 10 to be inserted into the depth of the cutout 21$n$.

In the state that the connector 10 is inserted into the depth of the cutout 21$n$, the abutting surfaces 121 of the guide members 120 opposed to each other clamp the contact edge side 21$c$ of the separator 21. When the connector 10 is inserted into the further depth, the contact edge side 21$c$ is easily in contact with the contact surface 200$t$ of the terminal 200 as illustrated in FIG. 11. More specifically, the thickness of the separator is as small as, for example, 0.01 mm to 0.5 mm, while the width of the contact surface 200$t$ is as narrow as several millimeters. It is accordingly not easy to bring the contact surface 200 into contact with the separator. The guide members 120 have the abutting surfaces 121 opposed to each other ahead of the terminal 200. In the course of insertion of the connector 10 into the separator 21, the guide members 120 can thus clamp the separator 21 before the separator 21 comes into contact with the terminal 200. Even when the connector 10 slightly shifts its position in the stacking direction of the separators in the course of insertion, this configuration enables the contact surface 200t of the terminal 200 to be stably in contact with the separator 21.

As illustrated in FIG. 11, when the connector 10 is further inserted into the depth of the cutout 21n in the state that the contact surface 200t of the terminal 200 is in contact with the contact edge side 21c, the contact surface 200t of the terminal 200 is pressed down backward of the connector 10 by the contact edge side 21c. When the pressing force applied to the tab elements 111 on both sides in the directions approaching to each other is released in the state that the contact surface 200t of the terminal 200 is pressed down backward of the connector 10, the resilience of the case mounting structures 110 causes the engagement elements 112 to be engaged with the engaged elements 21h. This prevents the connector 10 from coming out of the cutout 21n by the force of the terminal 200 pressing back the separator 21. The connector 10 of the embodiment is thus fixed to the separator 21, while compressing and elastically deforming the terminal 200 in the insertion direction.

Figure 12:
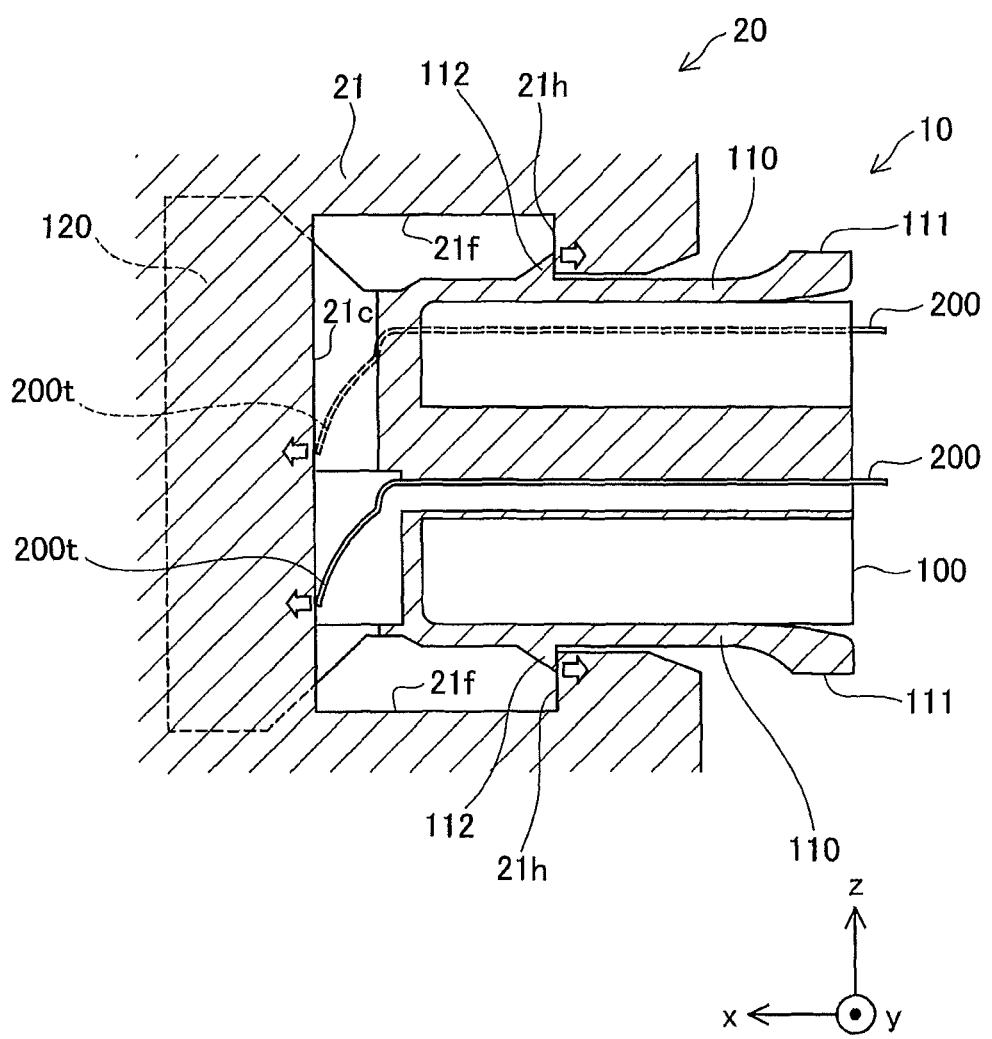
FIG. 12 illustrates a stress of the connector acting on the separator.

FIG. 12 illustrates a stress of the connector acting on the separator. The connector 10 presses back the separator 21 in the insertion direction of the connector 10 by the elastic force of the terminal 200 as shown by the open arrows in FIG. 12. By its reactive force, the engagement elements 112 of the connector 10 press back the engaged elements 21h in the direction opposite to the insertion direction. The connector 10 is accordingly fixed to the separator 21 by the elastic force of the terminal 200 in the state that the contact surface 200t of the terminal 200 applies a stress to the contact edge side 21c and the engagement elements 112 apply a stress to the engaged elements 21h.

Figure 13:
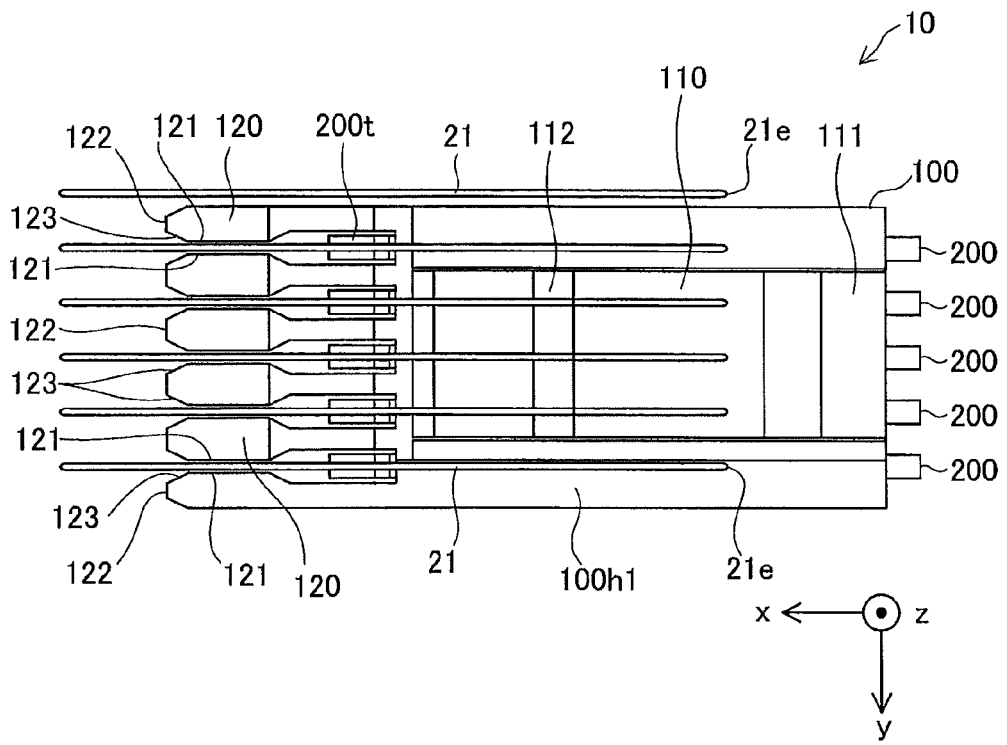
FIG. 13 schematically illustrates the top view of the state that the connector is attached to the fuel cell.
Figure 14:
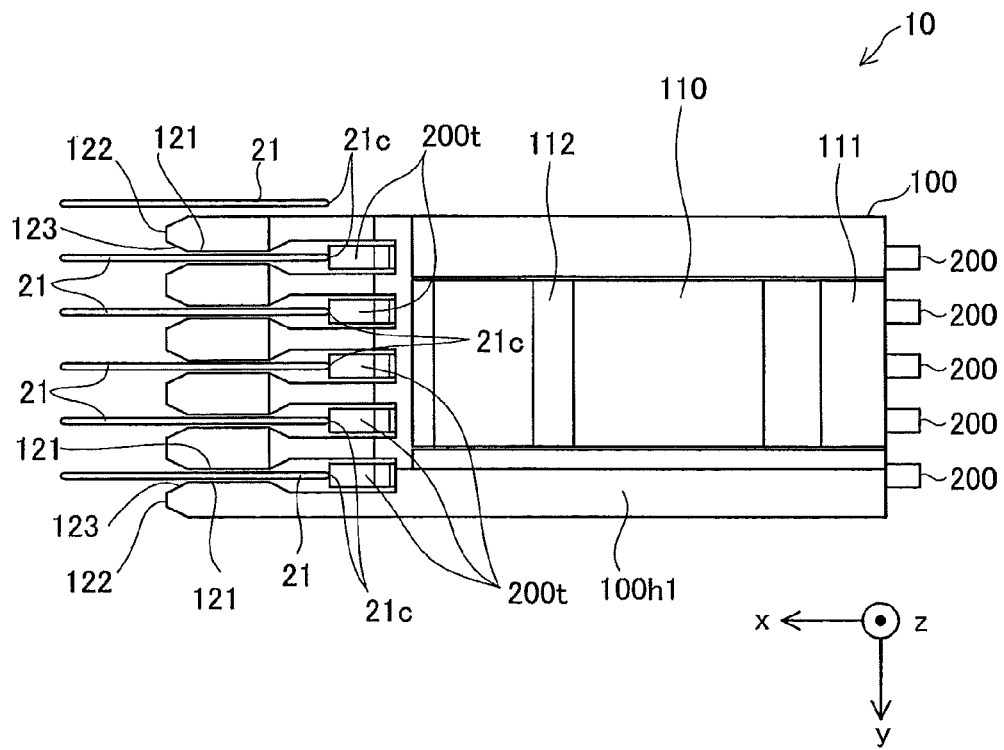
FIG. 14 illustrates the state that the separators are in contact with the terminals.

FIG. 13 schematically illustrates the top view of the state that the connector is attached to the fuel cell. FIG. 13 corresponds to the view of the separators 21 and the connector 10 taken on the 13-13 cross section of FIG. 1. FIG. 14 illustrates the state that the separators are in contact with the terminals. FIG. 14 corresponds to the top view of the connector 10 and the view of the separators 21 taken on the cross section 14-14 of FIG. 1.

As illustrated in FIG. 13, the connector 10 is attached to the fuel cell 20 in the state that the separator 21 is clamped between the abutting surfaces 121 of the guide members 120. This restricts the motion of the connector 10 attached to the fuel cell 20 in the left-right direction (stacking direction of the separators). As illustrated in FIG. 14, the connector 10 is attached to the fuel cell 20 in the state that the contact edge sides 21c of the separators 21 are respectively in contact with the contact surfaces 200t of the terminals 200. The abutting surfaces 121 of the guide members 120 clamp the separator 21 ahead of the terminal 200, so that the terminal 200 is in contact with the contact edge side 21c of the separator 21 at the center of the contact surface 200t during attachment of the connector 10 to the fuel cell 20.

As described above, when the connector 10 of the embodiment is connected with the fuel cell 20, the terminal 200 is elastically deformed in the insertion direction of the connector 10 to be in contact with the separator. This effectively reduces the possibility of failure, such as bad connection or damage during connection of the connector 10 with the fuel cell 20. More specifically, the connector 10 is electrically connected with the fuel cell 20 by abutment of the terminal 200 with the contact edge side 21c of the separator 21. By insertion of the connector 10 into the fuel cell 10, the connector 10 can thus be attached to the fuel cell 20 without sliding the terminal 200 on the surface of the separator 21. The connector 10 of the embodiment accordingly prevents the increase of the contact resistance and eliminates the potential failure such as bad connection caused by sliding the terminal 200 on the surface of the separator 21. In the connector 10, the terminal 200 is in contact with the separator 21 under application of a stress in the insertion direction of the connector 10. This enables the contact of the terminal 200 with the separator 21 to be stably kept even in the event of vibration or degradation.

One known structure of the connector uses a terminal of two plates stacked in a clip shape to clamp the separator. When this connector is attached to the fuel cell, sliding the terminal on the surface of the separator is required to clamp the separator. Such sliding may cause flaw or deformation on the terminal or the separator surface and may result in the increased contact resistance or the bad connection. In the connector 10 of the invention, however, the terminal 200 is in contact with the edge side of the separator 21 in the insertion direction of the connector. This effectively prevents the potential damage or deformation on the contact surfaces of the terminal 200 and the separator 21 by the friction of the terminal 200 against the separator 21 during attachment of the connector 10 to the fuel cell 20.

The connector having the terminals contractable and expandable in the insertion direction is not used as the connector to be connected with the separators of the fuel cell, because of the following reason. The separator is very thin and is thus thought to have the small contact area and fail to maintain the good contact when the terminal of the connector is in contact with the edge side of the separator. The connector generally includes two connection sections, i.e., the connecting-side connector section and the connected-side connector section. The thermal shapes of these two connector sections and the connection method can thus be set relatively arbitrarily. The connector to be connected with the separators of the fuel cell has the limitations in shape, since the connected-side connector section is formed by the stacked separators. It is accordingly not easy to change the shape of the connector. This means that the connector to be connected with the separators of the fuel cells generally uses the clip-shaped terminal to clamp the separator and thereby has difficulty in employing the similar configuration to that of the general connector including the two connection sections, i.e., the connecting-side connector section and the connected-side connector section. The configuration of the connector 10 of the invention is based on the inventors' finding that the terminal 200 can be stably connected with the edge side of the separator 21 by the contact with the edge side of the separator 21 in the insertion direction of the connector 10. This configuration also prevents the potential damage or deformation on the contact surfaces of the terminal 200 and the separator 21 by the friction of the terminal 200 against the separator 21 during attachment of the connector 10 to the fuel cell 20.

When the connector 10 of the embodiment is connected with the fuel cell 20, the terminal 200 is elastically deformed in the insertion direction of the connector 10 and is in contact with the separator. This reduces the possibility of failure due to the manufacturing errors of the separator 21 and the terminal 200. More specifically, even when the limitation of the manufacturing accuracy causes the plurality of separators stacked in the fuel cell to have misaligned ends, the contractable and expandable mechanism of the terminals 200 of the connector 10 in the insertion direction enable each of the terminals inserted into the fuel cell to be expanded or contracted according to the shape of the end of the corresponding separator and thereby come into contact with the edge side of the separator. The connector 10 is not necessarily required to be in contact with the edge side of the separator at the center of the contact surface 200t. The terminal 200 can thus be in contact with the separator even when the stacking interval between the separators of the fuel cell is not uniform or when part of the separators have bent ends.

Even when the limitation of the manufacturing accuracy causes misalignment of the contact surfaces 200t of the respective terminals 200 in the connector or causes inclined orientation of part of the terminals 200 relative to the insertion direction, the contractable and expandable terminal 200 can be in contact with the edge side of the separator. The terminal 200 may also be in contact with the edge side of the separator at the position other than the center of the contact surface 200t. The connector 10 of the invention accordingly has robustness that ensures attachment even in the presence of the manufacturing error of either the separator or the connector.

D. Modifications

The invention is not limited to the above embodiment but various modifications and variations may be made to the embodiment without departing from the scope of the invention. Some examples of possible modifications are given below.

D1. Modification 1

According to the above embodiment, each terminal 200 of the connector 10 is formed of the long flat plate member as shown in FIG. 6. The terminal 200 is, however, not limited to the flat plate member, but may be any member having the elastically contractable and expandable structure in at least one direction, for example, elastic member such as coil spring. The connector of this modification has the similar advantageous effects to those of the connector 10 of the above embodiment.

D2. Modification 2

According to the above embodiment, the guide member 120 of the connector 10 has the abutting surface 121 and the chamfered edge 123. The guide member 120 may be structured without at least one of these elements. In the connector 10, the width W2 of the guide member 120 in the top-bottom direction is the largest width among the widths of the connector casing 100 in the top-bottom direction. The width W2 of the guide member 120 is, however, not necessarily the largest width among the widths of the connector casing 100 in the top-bottom direction. The width W2 of the guide member 120 may be narrower than the width W5 of the cutout 21n of the separator 21.

D3. Modification 3

According to the above embodiment, the connector 10 has the engagement elements 112 on both sides of the connector casing 100. The connector 10 may be structured without the engagement element 112 on one side of the connector casing 100. The engagement element 112 may be formed on at least one of left and right side surfaces f the connector casing 100, instead of in the top-bottom direction.

The engagement element 112 is formed on part of the long plate-like case mounting structure 110, and the width W1 of the connector casing 100 is varied by bending the case mounting structure 110. The engagement element 112 is, however, not limited to this structure but may be any other structure that can vary the width of the connector casing 100. For example, the engagement element 112 may be structured to be protruded from or retreated in part of the connector casing 100, for example, by the spring force.

D4. Modification 4

According to the above embodiment, the connector 10 is constructed such that only the contact surface 200t of the terminal 200 is in contact with the contact edge side 21c when the connector 10 is inserted into the cutout 21n of the separator 21 as illustrated in FIG. 12. Alternatively the connector 10 may be structured to further include an abutting element that abuts the contact edge side 21c and thereby prevents the connector 10 from going into the depth of or over a predetermined level in the cutout 21n when the connector 10 is inserted into the cutout 21n of the separator 21.

D5. Modification 5

The above embodiment describes the connector as one aspect of the invention. The invention may be implemented by any of various other aspects: for example, a detection device of, e.g., voltage using the above connector and a fuel cell system including the above connector. The connector or the fuel cell according to the invention may be used in combination with another adequate member.

REFERENCE SIGNS LIST

10 Connector
20 Fuel cell
21 Separator
21n Cutout
100 Connector casing
110 Case mounting structure
111 Tab element
112 Engagement element
120 Guide member
121 Abutting surface
200 Terminal
200b Flexion
200t Contact surface

The invention claimed is:

1. A connector that is connected with a connector joint structure formed in separators in a fuel cell stack, the connector comprising:
   a connector casing;
   a terminal element that is provided in the connector casing and is configured to be in contact with an edge side of the separator and to be elastically deformed in an insertion direction of the connector that is orthogonal to a stacking direction of the separators, when the connector is connected with the connector joint structure;
   an engagement element that is formed in the connector casing and is configured to engage with the connector joint structure and restrict motion of the connector in the insertion direction when the connector is connected with the connector joint structure; and
   guide members that are formed in the connector casing to be extended from both sides of the terminal element in the insertion direction and respectively have opposing surfaces that are provided ahead of the terminal element in the insertion direction to face each other in a direction orthogonal to the insertion direction,
   wherein when the connector is connected with the connector joint structure, the guide members clamp the separator by their opposing surfaces that face each other.

2. The connector according to claim 1,
wherein the terminal element is formed of a long flat plate member having electrical conductivity and has a contact surface formed by bending on one end thereof to be in contact with the edge side of the separator,
wherein the terminal element is elastically deformed in its longitudinal direction by pressing the contact surface against the edge side of the separator.

3. The connector according to claim 1, wherein
the engagement element is provided in the connector casing such that a width of at least part of the connector casing is contractable and expandable in a direction orthogonal to the insertion direction, and when the connector is connected with the connector joint structure, the width of at least part of the connector casing is expanded to make the engagement element engaged with the connector joint structure.

4. The connector according to claim 3, wherein
the engagement element is provided on respective one of both sides of the connector casing.

5. The connector according to claim 1, wherein
a width of the guide member in the direction orthogonal to the insertion direction is greater than a width of the other part of the connector casing other than the guide member in the direction orthogonal to the insertion direction.

6. The connector according to claim 1, wherein
the connector is connected with the connector joint structure that is formed by cutting out part of an outer periphery of the separator in the insertion direction.

7. A fuel cell, comprising:
a membrane electrode assembly;
separators that are arranged on both sides of the membrane electrode assembly and have a connector joint structure that is to be connected with a connector; and
the connector that is connected with the connector joint structure,
wherein the connector comprise:
   a connector casing;
   a terminal element that is provided in the connector casing and is configured to be in contact with an edge side of the separator and to be elastically deformed in an insertion direction of the connector that is orthogonal to a stacking direction of the separators, when the connector is connected with the connector joint structure;
   an engagement element that is formed in the connector casing and is configured to engage with the connector joint structure and restrict motion of the connector in the insertion direction when the connector is connected with the connector joint structure; and
guide members that are formed in the connector casing to be extended from both sides of the terminal element in the insertion direction and respectively have opposing surfaces that are provided ahead of the terminal element in the insertion direction to face each other in a direction orthogonal to the insertion direction,
wherein the connector joint structure comprises:
   a cutout that is formed by cutting out part of an outer periphery of the separator in the insertion direction; and
   an engaged element that is formed inside the cutout to engage with the engagement element of the connector,
wherein when the connector is connected with the connector joint structure, the guide members clamp the separator by their opposing surfaces that face each other.

8. The fuel cell according to claim 7,
wherein a width of the guide member in the direction orthogonal to the insertion direction is greater than a width of the other part of the connector casing other than the guide member in the direction orthogonal to the insertion direction.

* * * * *